United States Patent
Sun

(10) Patent No.: US 11,627,205 B2
(45) Date of Patent: Apr. 11, 2023

(54) INFORMATION PROCESSING METHOD AND APPARATUS, COMMUNICATION DEVICE AND STORAGE MEDIUM

(71) Applicant: BEIJING XIAOMI MOBILE SOFTWARE CO., LTD., Beijing (CN)

(72) Inventor: Daliang Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/334,614

(22) Filed: May 28, 2021

(65) Prior Publication Data

US 2022/0166849 A1 May 26, 2022

(30) Foreign Application Priority Data

Nov. 25, 2020 (CN) .......................... 202011338492.7

(51) Int. Cl.
*H04L 67/63* (2022.01)
*H04L 9/40* (2022.01)
(Continued)

(52) U.S. Cl.
CPC .......... *H04L 67/63* (2022.05); *H04L 63/0428* (2013.01); *H04W 8/18* (2013.01); *H04W 8/22* (2013.01); *H04W 52/0212* (2013.01)

(58) Field of Classification Search
CPC ...... H04L 67/63; H04L 63/0428; H04W 8/18; H04W 8/22; H04W 52/0212
(Continued)

(56) References Cited

U.S. PATENT DOCUMENTS 7,974,478 B2 * 7/2011 Bashyam ................ G06T 9/001
382/233
8,498,417 B1 * 7/2013 Harwood ............ H04L 67/1097
713/193
(Continued)

FOREIGN PATENT DOCUMENTS

| CN | 108513290 A | 9/2018 |
|---|---|---|
| CN | 109391648 A | 2/2019 |

(Continued)

OTHER PUBLICATIONS

European Search Report in the European Application No. 21176716.5, dated Nov. 8, 2021, (8p).

(Continued)

*Primary Examiner* — Thu Ha T Nguyen
(74) *Attorney, Agent, or Firm* — Arch & Lake LLP

(57) ABSTRACT

A method and apparatus, a communication device and a storage medium for information processing are provided. The method includes determining application information of a target application and terminal information of a terminal. The target application is an application requiring use of a network slice for data transmission and the terminal information is able to reflect a terminal capability of the terminal. The method further includes sending request information to a server according to the application information and the terminal information. The method also includes receiving slice information returned by the server based on the request information. A network slice indicated by the slice information is matched with the target application and the terminal capability. The method further includes transmitting data of the target application based on the network slice indicated by the slice information.

16 Claims, 7 Drawing Sheets

(51) Int. Cl.
  *H04W 8/18* (2009.01)
  *H04W 8/22* (2009.01)
  *H04W 52/02* (2009.01)

(58) Field of Classification Search
  USPC .......................................................... 709/219
  See application file for complete search history.

(56) References Cited

U.S. PATENT DOCUMENTS

| | | | | |
|---|---|---|---|---|
| 8,903,088 | B2* | 12/2014 | Schultz | H04N 21/8352 |
| | | | | 380/211 |
| 9,009,265 | B2* | 4/2015 | Zapata | H04L 43/0811 |
| | | | | 709/219 |
| 9,031,229 | B1* | 5/2015 | Nita | H04L 63/0428 |
| | | | | 713/150 |
| 9,830,278 | B1* | 11/2017 | Harwood | H04L 63/061 |
| 9,946,810 | B1* | 4/2018 | Trepetin | G06F 7/00 |
| 10,477,391 | B1* | 11/2019 | Verma | H04W 8/18 |
| 10,574,670 | B1* | 2/2020 | Verma | H04W 12/72 |
| 10,936,744 | B1* | 3/2021 | Trepetin | H04L 9/0861 |
| 11,284,221 | B2* | 3/2022 | Guo | H04L 12/189 |
| 2002/0026502 | A1* | 2/2002 | Phillips | H04L 9/40 |
| | | | | 709/219 |
| 2004/0083299 | A1* | 4/2004 | Dietz | H04L 49/205 |
| | | | | 709/230 |
| 2005/0138398 | A1* | 6/2005 | Hansen | G06F 21/6245 |
| | | | | 713/189 |
| 2011/0149087 | A1* | 6/2011 | Jeong | H04N 19/115 |
| | | | | 375/E7.126 |
| 2011/0225417 | A1* | 9/2011 | Maharajh | G06Q 10/06 |
| | | | | 713/150 |
| 2013/0031216 | A1* | 1/2013 | Willis | H04L 67/02 |
| | | | | 709/219 |
| 2015/0244517 | A1* | 8/2015 | Nita | H04L 63/0428 |
| | | | | 713/168 |
| 2017/0237718 | A1* | 8/2017 | Chen | H04L 9/0838 |
| | | | | 713/168 |
| 2018/0075262 | A1* | 3/2018 | Auh | H04L 9/0861 |
| 2018/0109504 | A1* | 4/2018 | Poffenbarger | H04L 9/3234 |
| 2018/0189867 | A1* | 7/2018 | Hu | H04L 67/02 |
| 2018/0227837 | A1* | 8/2018 | Starsinic | H04W 4/60 |
| 2019/0075511 | A1* | 3/2019 | Ryu | H04W 68/005 |
| 2019/0098569 | A1 | 3/2019 | Hou et al. | |
| 2019/0141081 | A1* | 5/2019 | Kunz | H04W 8/04 |
| 2019/0261159 | A1* | 8/2019 | Wang | H04W 60/00 |
| 2019/0342079 | A1* | 11/2019 | Rudzitis | G06F 21/72 |
| 2019/0363843 | A1 | 11/2019 | Gordaychik | |
| 2019/0387401 | A1* | 12/2019 | Liao | H04W 28/0289 |
| 2020/0076709 | A1* | 3/2020 | Stenberg | H04L 67/1029 |
| 2020/0106812 | A1* | 4/2020 | Verma | H04L 63/0227 |
| 2020/0120548 | A1* | 4/2020 | Jin | H04W 36/0069 |
| 2020/0120721 | A1* | 4/2020 | Lau | H04W 76/11 |
| 2020/0159676 | A1* | 5/2020 | Durham | G06F 9/30178 |
| 2020/0187088 | A1* | 6/2020 | Chun | H04W 48/02 |
| 2020/0201789 | A1* | 6/2020 | Durham | H04L 9/0631 |
| 2020/0226952 | A1* | 7/2020 | Lightowler | H04L 9/0637 |
| 2020/0230499 | A1* | 7/2020 | Buser | A63F 13/352 |
| 2020/0259636 | A1* | 8/2020 | Gottipati | G06F 3/0641 |
| 2020/0274656 | A1 | 8/2020 | Gordaychik | |
| 2020/0389469 | A1* | 12/2020 | Litichever | H04L 63/029 |
| 2021/0026985 | A1* | 1/2021 | Rind | G06F 21/6254 |
| 2021/0058984 | A1 | 2/2021 | Lau et al. | |
| 2021/0068095 | A1 | 3/2021 | Gordaychik | |
| 2021/0152615 | A1 | 5/2021 | Karampatsis et al. | |
| 2021/0243232 | A1* | 8/2021 | Verma | H04L 63/1408 |
| 2021/0258308 | A1* | 8/2021 | Avetisov | H04L 9/3234 |
| 2021/0263779 | A1* | 8/2021 | Haghighat | G06F 9/5061 |
| 2021/0279868 | A1* | 9/2021 | Ma | G06N 3/08 |
| 2021/0289351 | A1* | 9/2021 | Ferdi | H04W 12/041 |
| 2021/0320794 | A1* | 10/2021 | Auh | H04L 9/0861 |
| 2021/0326478 | A1* | 10/2021 | Rind | G06F 21/602 |
| 2021/0377016 | A1* | 12/2021 | Perlman | H04L 9/0891 |
| 2022/0053375 | A1* | 2/2022 | Asawa | H04W 72/0453 |
| 2022/0100884 | A1* | 3/2022 | Fink | G06F 21/6254 |
| 2022/0103335 | A1* | 3/2022 | Moon | H04L 7/005 |
| 2022/0138081 | A1* | 5/2022 | Varma | G06F 11/3612 |
| | | | | 717/124 |
| 2022/0166849 | A1* | 5/2022 | Sun | H04W 8/18 |
| 2022/0187841 | A1* | 6/2022 | Ebrahimi Afrouzi | |
| | | | | G05D 1/0274 |
| 2022/0239471 | A1* | 7/2022 | Perlman | H04L 9/085 |
| 2022/0382885 | A1* | 12/2022 | Durham | G06F 9/5016 |
| 2022/0407725 | A1* | 12/2022 | Chai | G06F 16/152 |

FOREIGN PATENT DOCUMENTS

| | | |
|---|---|---|
| CN | 110768836 A | 2/2020 |
| WO | 2019075848 A1 | 4/2019 |
| WO | 2019192692 A1 | 10/2019 |

OTHER PUBLICATIONS

First Office Action of the Chinese application No. 202011338492.7, dated Nov. 18, 2022, with English translation, (16p).

* cited by examiner

INFORMATION PROCESSING METHOD AND APPARATUS, COMMUNICATION DEVICE AND STORAGE MEDIUM

CROSS-REFERENCE TO RELATED APPLICATION

The present application is filed based upon and claims priority to Chinese Patent Application 202011338492.7, filed on Nov. 25, 2020, the entire contents of which are hereby incorporated by reference for all purposes.

TECHNICAL FIELD

The disclosure relates to the technical field of networks, and more particularly, to an information processing method and apparatus, a communication device and a storage medium.

BACKGROUND

The network slice is an on-demand networking manner, through which an operator can separate out multiple virtual end-to-end networks on the uniform infrastructure. Each network slice is logically isolated from a carrier network of a wireless access network to a core network, so as to adapt to various types of data transmission scenarios.

The 5$^{th}$ Generation (5G) has two networking manners, namely, Stand Alone (SA) and Non Stand Alone (NSA). The network slice is applied in the SA more widely. However, in some cases, the use effect of the network slice is not as expected, for example, the transmission rate of the network slice does not reach an expected rate, or, the terminal loses its advantages of power saving and the like with the use of the network slice.

SUMMARY

The disclosure provides an information processing method and apparatus, a communication device and a storage medium.

According to a first aspect of the present disclosure, a method for information processing is provided. The method may be applied to a terminal. The terminal may determine application information of a target application and terminal information of the terminal. The target application is an application requiring use of a network slice for data transmission and the terminal information is able to reflect a terminal capability of the terminal. The terminal may further send request information to a server according to the application information and the terminal information. The terminal may also receive slice information returned by the server based on the request information. A network slice indicated by the slice information is matched with the target application and the terminal capability. The terminal may also transmit data of the target application based on the network slice indicated by the slice information.

According to a second aspect of the present disclosure, a method for information processing is provided. The method may receive request information sent by a terminal. The method may also determine slice information according to the request information. A network slice indicated by the slice information is matched with a target application of the terminal and a terminal capability of the terminal. The method may further send slice information to the terminal.

According to a third aspect of the present disclosure, an apparatus is provided. The apparatus may include one or more processors, a non-transitory computer-readable memory storing instructions executable by the one or more processors a plurality of program modules that, when executed by the one or more processors, cause the apparatus to perform predefined functions. The apparatus may include a first determination module, configured to determine application information of a target application and terminal information of the terminal. The target application is an application requiring use of a network slice for data transmission and the terminal information is able to reflect a terminal capability of the terminal. The apparatus may also include a first sending module, configured to send request information to a server according to the application information and the terminal information. The apparatus may further include a first receiving module, configured to receive slice information returned by the server based on the request information. A network slice indicated by the slice information is matched with the target application and the terminal capability. The apparatus may also include a transmission module, configured to transmit data of the target application based on the network slice indicated by the slice information.

It is to be understood that the above general descriptions and detailed descriptions below are only example and explanatory and not intended to limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses detailed in the appended claims and consistent with some aspects of the disclosure.

Figure 1:
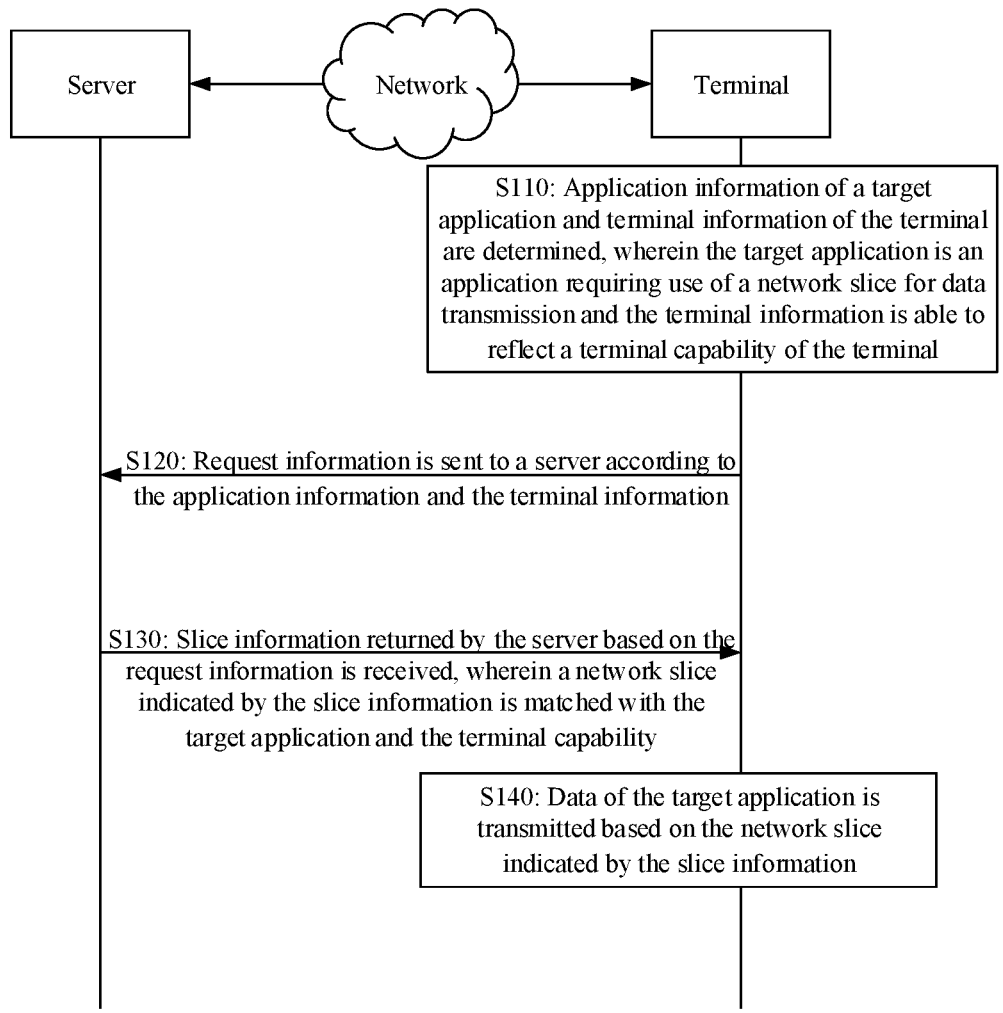
FIG. 1 is a flow chart illustrating an information processing method, according to an example embodiment.

As shown in FIG. 1, the present disclosure provides an information processing method, which is applied to a terminal and includes the following operations.

In S110, application information of a target application and terminal information of the terminal are determined, wherein the target application is an application requiring use of a network slice for data transmission and the terminal information is able to reflect a terminal capability of the terminal.

In S120, request information is sent to a server according to the application information and the terminal information.

In S130, slice information returned by the server based on the request information is received, wherein a network slice indicated by the slice information is matched with the target application and the terminal capability.

In S140, data of the target application is transmitted based on the network slice indicated by the slice information.

In the embodiment of the disclosure, the terminal may include a mobile terminal and/or a fixed terminal, which are specifically but not limited to at least one of the following electronic devices: a mobile phone, a tablet, a wearable device, a vehicle-mounted device or a smart device. The smart device includes, but is not limited to: a smart home device and/or a smart office device.

One communication terminal may be provided with various applications, for example, a social application, shopping application, web browsing application, push-news application, video play and/or record application, audio and/or broadcast play application, game application, tourism application and/or navigation application.

For these applications, data packets may be sent by using conventional communication paths other than the network slices to provide application services for users.

Certainly, for these applications, the network slices may also be used to provide the application services. As the network slice is an end-to-end transmission network formed by resource configuration, the intermediate route and/or the number of forwarding times are reduced, thereby improving the transmission rate or providing a more stable network transmission.

Exemplarily, when one application is newly installed in the terminal or one terminal is newly put into use, it may be determined whether there is a need to use the network slice based on a subscription operation of the user. When the SIM card used by the terminal switches or based on the reasons such as the subscription operation of opening the network slice for use, one application in the terminal may be switched from a case not using the network slice for transmission to a case using the network slice for transmission, and thus the application has the requirement of using the network slice.

In the embodiment of the disclosure, the terminal determines the application information of the target application that needs to use the network slice. The application information may identify the target application or reflect property characteristics of the target application. The property characteristics of the target application include, but are not limited to: a bandwidth required when the target application runs, and a traffic type generated when the target application runs. For example, the traffic type includes: text-based text traffic, picture-based picture traffic, and audio and/or video-based audio/video traffic, etc.

After acquiring the terminal information that directly or indirectly reflects the terminal capability and program information, the terminal sends the request information to the server. The request information is configured to request slice information of a network slice that is available for the terminal to transmit data of the target application.

In the embodiment of the disclosure, the server may be a server provided by the device provider of the terminal, may also be a server of the network operator of the communication network, and may further be a server of the service provider of the target application. In the present disclosure, the server is a server that can determine, according to the request information sent by the terminal, the network slice matched with the target application and the terminal capability of the terminal.

The server may be accessed to a trust domain of the communication network through the Network Exposure Function (NEF) of the communication network. The trust domain may include the network element of the core network of the communication network, such as the Access Management Function (AMF) or the Session Management Function (SMF).

In some embodiments, the server may be placed in the trust domain of the communication network. For example, the server may be a compositional server for User Data Management (UDM) and the like.

The terminal is connected with the server through the network shown in FIG. 1.

Figure 2:
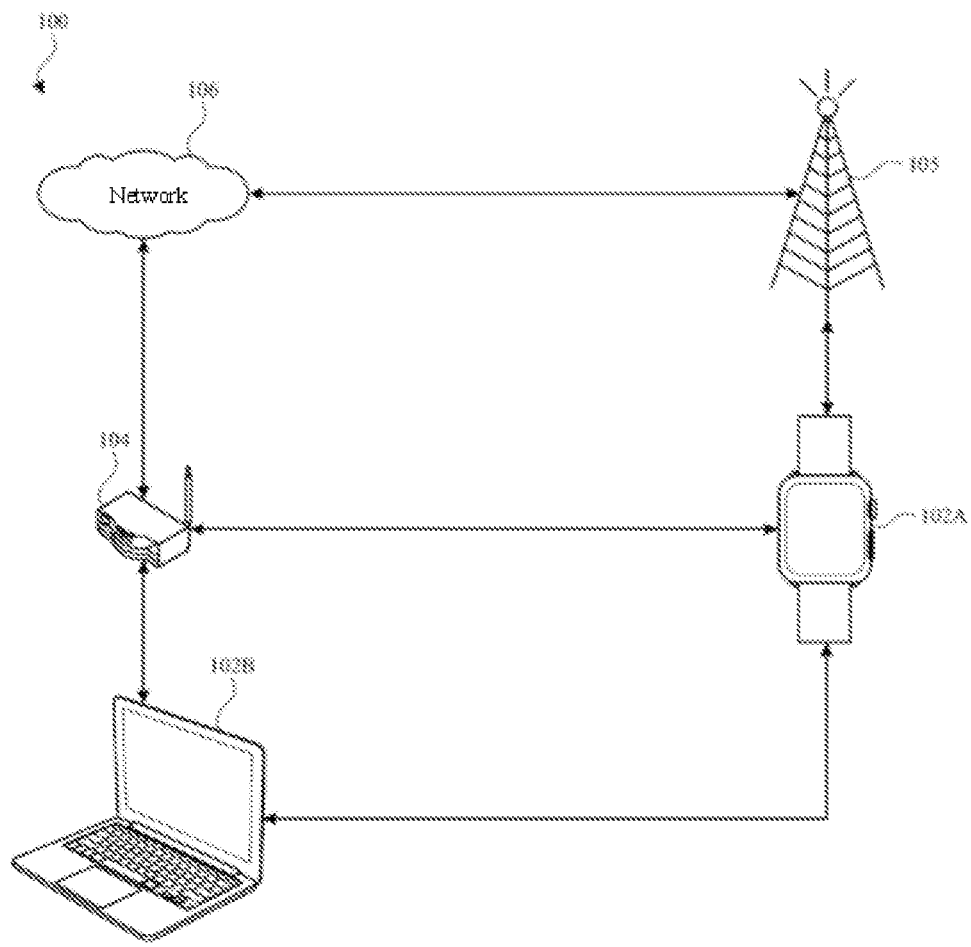
FIG. 2 is a schematic diagram illustrating access of a terminal to a network, according to an example embodiment.

FIG. 2 is a schematic diagram illustrating a connection of a terminal to a network. The terminal shown in FIG. 2 may include a smartwatch 102A and a notebook computer 102B. In the network environment 100, the smartwatch 102A may be connected to the network 106 through a Wireless Fidelity (Wi-Fi) router 104 and may also be connected to the network 106 through a base station 105. In an embodiment, the request information may directly carry the application information and the terminal information in a plaintext form. In such case, upon the request information is received, the server can know the application information and the terminal information provided by the terminal, and thus select the network slice matched with both the target application and the terminal information and send the slice information of the selected network slice to the requesting terminal.

The case that the network slice indicated by the slice information is matched with the target application and the terminal capability may include at least one of the following.

The network slice indicated by the slice information is a network slice that can be used by the target application, and the terminal capability required for use of the network slice indicated by the slice information is included in the capability range indicated by the terminal information.

The network slice indicated by the slice information is a network slice that can be used by the target application, and the terminal capability of the terminal information uses the network slice for data transmission, with the transmission rate of the network slice reaching to a preset threshold and the performance of the terminal being kept within a preset range. For example, the case that the transmission rate of the network slice reaches to the preset threshold may include that: the transmission rate may reach such as 80% or 75% of the maximum transmission rate of the network slice. For example, the case that the performance of the terminal is kept within the preset range may include that: the power saving performance of the terminal is kept at a low-power consumption level, without entering a high-power consumption level. The low-power consumption level and the high-power consumption level may be distinguished by a power consumption threshold, for example, the power consumption higher than the power consumption threshold is the high-power consumption level, otherwise, is the low-power consumption level. The network slice that can be used by the target application may be a network slice subscribed by the target application for use, and/or, a network slice opened by the communication network for free to be used by the target application. The slice information herein includes, but is not limited to at least one of the following:

Network Slice Selection Assistance Information (NS-SAI);

and/or,

Single Network Slice Selection Assistance Information (S-NSSAI).

The NSSAI indicates a set of network slices. The network slices in the set typically belong to network slices of the same type.

The S-NSSAI indicates a specific network slice.

After getting the slice information of the network slice, the terminal knows the network slice recommended to be used by the target application running in the terminal and performs the data transmission of the target application based on the network slice. Therefore, the disclosure improves the communication service quality provided by the network slice as much as possible on one hand, and on the other hand, reduces the adverse effect on the terminal due to the use of the network slice and ensures the own operation advantages of the terminal.

For example, if one target application can run in the mobile phone and the smartwatch both, the mobile phone and the smartwatch are terminal devices but vary a lot in communication capability and processing capability. At this time, if the same network slice is used to provide the application service of the target application, there may be the following problems: the slicing capability of the network slice may not be fully used in the smartwatch, and the smartwatch requiring the capability of the network slice may be continuously in the high-power state, such that the situation such as the power saving purpose cannot be implemented. However, in the mobile phone, the bandwidth provided by the network slice may not be matched with the bandwidth provided by the mobile phone, such that the application service of the target application in the mobile phone cannot be optimal.

In the present disclosure, when the network slice used by the target application for data transmission is selected, the selection is not made purely depending on the target application, but is considered overall in combination with the terminal capability of the terminal running the target application. Therefore, the disclosure may select the network slice more suitable for the present operation scenario of the target application for data transmission, ensure the quality of the application service provided by the target application, and keep the own characteristics of the terminal as much as possible.

The terminal information includes at least one of the following:

type information on a terminal type of the terminal;

component information of hardware of the terminal; or, type information on a network type supported by the terminal.

Different types of terminals have different terminal capabilities.

The terminal capability includes, but is not limited to at least one of the following: a communication capability, a processing capability or an endurance capability, etc.

For example, the communication capability includes at least one of the following: a communication scheme supported by the terminal, a communication bandwidth supported by the terminal, a communication manner supported by the terminal or the like. For example, some terminals support the 5G communication, some terminals only support the 4G communication, while the 5G communication and the 4G communication involve different communication schemes. The bandwidth that may be supported by the Internet-of-things device is less than the bandwidth of the user portable device such as the mobile phone. The processing capability includes a processing rate and/or computing capability type of a processing module in the terminal. The processing module includes, but is not limited to: a Central Processing Unit (CPU) and a Graphics Processing Unit (GPU). If a large number of vector operations are involved, the GPU may be required but the terminal only having the CPU may not support. If the network slice supports the high-rate transmission, during transmission of the data packet, the processing module is required to package the data packet. However, the processing module has the limited processing capability and the packaging rate for the data packet cannot meet the requirement of the network slice, which may become bottlenecks of the network slice when the target application uses the network slice for data transmission to cause the resource waste and low effective usage rate of the network slice. A certain terminal is only provided with one antenna and only supports simplex communication, and a certain terminal is provided with multiple antennas and can support duplex communication and the like, all of which involve communication manners supported by the terminal.

The type information of the terminal may include at least one of the following:

a type code for directly indicating the terminal type; or an International Mobile Equipment Identity (IMEI) of the terminal, etc.

Certainly, the above are merely examples of the terminal information. During specific implementation, the terminal information may be not limited to the above any embodiment.

In some embodiments, the terminal information further includes capability activation information of the terminal. For example, in some scenarios, the terminal has one capability, but the capability of the terminal is deactivated based on the detected setting operation, and thus the network slice configured according to the deactivated capability also leads to the resource waste of the network slice. The capability activation information herein at least indicates a capability activated in the terminal.

The component information of the hardware component includes at least one of the following:

processor information of a processor in the terminal; or, network card information of a network card in the terminal;

and/or, the type information on the network type supported by the terminal includes at least one of the following:

SIM card information of an SIM in the terminal; or, identity information of a communication operator to which the SIM in the terminal belongs.

The processor information includes, but is not limited to: an ID of the CPU, a type of the CPU, and the number of bits of the CPU such as 16-bit CPU and 32-bit CPU. The computing capability of the 32-bit CPU is apparently higher than that of the 16-bit CPU.

The network card information of the network card in the terminal includes, but is not limited to: a Media Access Control (MAC) address, a maximum bandwidth supported by the network card and/or a bandwidth configured by the network card.

The network card includes, but is not limited to, a Wi-Fi network card.

The SIM card information includes type information of the SIM card and/or an ID of the SIM card. The type of the SIM card may be decoded from the ID of the SIM card. For example, a SIM card is a group card provided for students or one company. The group card has the special capability; or, compared with the non-group card, the group card does not have some communication capabilities.

The identity information of the communication operator to which the SIM in the terminal belongs includes, but is not limited to, an ID and/or a name of the operator. For example, with the cellular wireless communication as an example, there are at least three communication operators in mainland China, namely, Mobile, Unicom and Telecom. As communication networks of the communication operators are isolated, the SIM card belonging to the operator A cannot directly use the communication network of the communication operator B for communication in a case that no special service is opened.

In an embodiment, the SIM card information may be an Integrate Circuit Card Identity (ICCID).

In an embodiment, the terminal information may have one or more fields, and one field may carry one type of terminal information. For example, the terminal information has two fields, one field carrying the SIM card information, and the other field carrying the type information or the component information.

As the type of the terminal reflects the hardware included in the terminal to some extent, in order to reduce the bit overhead of the request information, either of the type information and the component information of the terminal may be carried in the request information.

Figure 3:
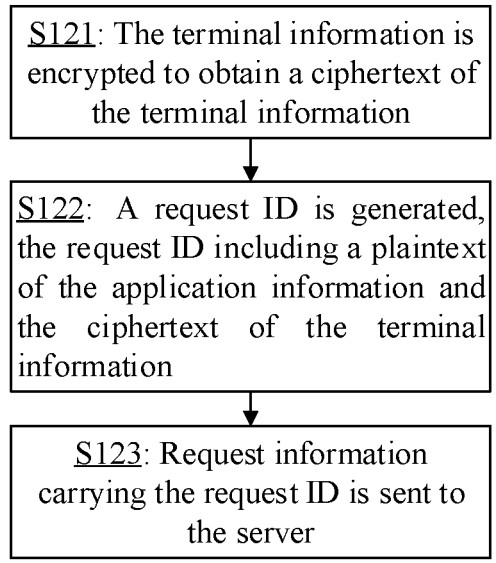
FIG. 3 is a flow chart illustrating an information processing method, according to an example embodiment.

In an embodiment, in order to improve the information security of the terminal, as shown in FIG. 3, the operation in S120 may include the following actions.

In S121, the terminal information is encrypted to obtain a ciphertext of the terminal information.

In S122, a request ID is generated, the request ID including a plaintext of the application information and the ciphertext of the terminal information.

In S123, request information carrying the request ID is sent to the server.

On one hand, the application information of the target application may be sent in the plaintext because the application information involves neither personal information of the user to which the terminal belongs nor the information of the terminal. On the other hand, there may be a great number of applications in the terminal. If all applications are encrypted, the server may have a slow speed when determining the network slice. For example, the application information is carried in the request information in the plaintext, in the condition of unnecessary decryption, the server directly searches network slices that can be used by the target application, and meanwhile, decrypts the terminal information to obtain the decrypted terminal information, and selects the network slice matched with the terminal capability from the network slices that can be used by the target application. With the parallel processing, the server can improve the rate for returning the slice information of the network slice, and reduce the load ratio of the server.

With the method provided by the present disclosure, the terminal information is encrypted on one hand to improve the information security and reduce the information leakage; and on the other hand, the rate for returning the slice information is ensured while the information security is improved.

In another embodiment, the content carried by the request information may at least include a ciphertext of the application information and a ciphertext of the terminal information.

In an embodiment, the operation in S121 may include that: the terminal information is encrypted according to an encryption manner known to both the terminal and the server; and/or, the operation in S122 may include that: the plaintext of the application information and the ciphertext of the terminal information are spliced according to a splicing manner c known to both the terminal and the server.

For example, the application information is an ID of the target application, and the ID is typically a character string. The ciphertext may also correspond to one character string. The plaintext and the ciphertext may be spliced in a splicing manner of splicing the plaintext first and then the ciphertext to obtain a spliced character string. The request information carries the spliced character string. Certainly, the plaintext and the ciphertext may also be spliced in a splicing manner of splicing the ciphertext first and then the plaintext to obtain another spliced character string carried in the request information.

For example, a character string format is set in the request information. The character string format is divided into two parts, one part being configured to carry the plaintext, and the other part being configured to carry the ciphertext. The number of bits included in the part carrying the plaintext is fixed. The application information may be supplemented by "0" in case of an insufficient length. If the length of the application information is more than the number of bits required by the plaintext part, the plaintext information may be carried by intercepting the application information. For example, the application information is an application ID; and such parts not representing application properties such as the serial number of the application ID may be removed to obtain the plaintext of the intercepted application information without the serial number. Certainly, this is merely for the example rather than a limit to the implementation manner.

Figure 4:
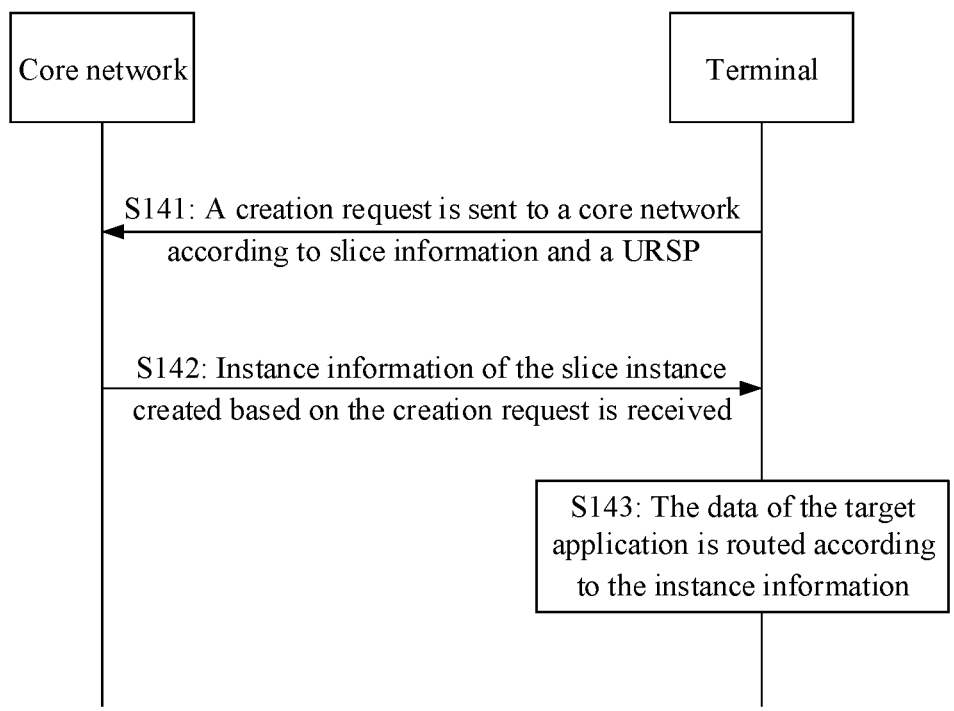
FIG. 4 is a flow chart illustrating an information processing method, according to an example embodiment.

As shown in FIG. 4, the operation in S140 may include the following actions.

In S141, a creation request is sent to a core network according to the slice information and a URSP. The creation request is configured to request the core network to create a slice instance of the network slice indicated by the slice information.

In S142, instance information of the slice instance created based on the creation request is received.

In S143, the data of the target application is routed according to the instance information.

The communication network is configured with the network slices. However, upon the network slices are configured (equivalent to resource reservation or resource pre-configuration), the specific allocation such as which UE is configured with the resources is not completed.

For example, if the UE needs to use the network slice for data transmission, the network side is required to establish the slice instance of the network slice according to the UE, which is equivalent to that the network side configures specific communication resources for the UE to use the network slice for data transmission.

In this way, after getting the slice information, the UE sends the creation request of the slice instance to the network side according to the URSP sent by the network side.

In an example, the creation request includes: slice information of a network slice corresponding to the slice instance requested to be created and a routing policy applied to the slice instance for data transmission and selected according to the URSP.

By doing so, after the network side (for example, the core network of the communication network) receives the creation request, if it is determined to establish the slice instance for the UE, the slice instance is configured at the network side, and instance information upon the configuration of the slice instance is returned to the terminal.

After getting the instance information, the terminal may use the created slice instance to send the data packet of the target application.

The instance information may at least include an ID of the slice instance. The ID may be carried in the data packet of the target application so as to be used by a subsequent data packet for routing the target application.

In some embodiments, the instance information may further include but not limited: a Domain Name System (DNS) and/or an Internet Protocol (IP) address using the slice instance for data transmission and/or a network card name and/or a port number of a network card for data transmission.

In some other embodiments, the instance information may further include routing information of the slice instance. With the routing information, when the terminal transmits the data packet of the target application with the slice instance, a routing link passing through the slice instance may be selected to transmit the data packet of the target application. Exemplarily, the routing information includes, but is not limited to, a port number of a port used by the terminal to transmit the target application, a destination address used to transmit the data with the slice instance and the like.

In an embodiment, the slice instance may be disposable, such as a slice instance used when the target application is started once. In another embodiment, the slice instance is not disposable. Once the slice instance is created but the indication is not deleted, the slice instance may be used all the time to transmit the data of the target application. That is, the target application performs the creation of the slice instance after getting the slice information for the first time. Once the slice instance is created, the target application may be re-started and use the slice instance for data transmission directly based on the instance information of the slice instance.

In some embodiments, the operation in S110 may include the following actions.

An input operation indicating use of the network slice for data transmission is detected.

An application to which the input operation is directed is determined as the target application.

For example, the input operation may be an operation for a transmission startup option of the network slice within the application interface of the corresponding application; and also for example, the input operation may be a selection operation that selects an application using the network slice in the setting page of the Operation System (OS).

Certainly, the above is merely examples for determining the target application, and the specific implementation is not limited to the above any example.

In an embodiment, the request information further includes user identity information of the terminal. The user identity information may be information uniquely identifying the user identity such as a mobile phone number corresponding to the SIM card, an e-mail address, and an account of instant messaging.

The user identity information may be used by the server to determine whether the terminal has an authority to use the network slice.

In the embodiment of the disclosure, the user identity information carried in the request information may authenticate the identity of the user using the network slice. Certainly, some network slice may be used by all users. In such case, the request information may not carry the user identity information.

In an embodiment, the operation in S120 may include that: a data network name (DNN) configuration returned by the server based on the request information is received. The DNN configuration carries the slice information.

The slice information may be carried in the DNN configuration. The DNN configuration is a configuration file for simply performing transmission configuration on the terminal.

In an embodiment, the method may further include the following operation.

Failure prompt information returned based on the request information is received. The failure prompt information indicates a failure in network slice registration. The network slice registration herein is that the request for the slice information of the network slice is failed.

There are many reasons for the failure of the request for the slice information, for example, the server determines according to a request record that the slice information is sent, or, the communication network does not configure an available network slice for the target application, etc.

In the embodiment of the disclosure, the method may further include the following operation.

It is determined whether to continuously request the slice information according to the failure prompt information.

A part of reasons for the failure of the request may be eliminated. For such a case, the slice information may be re-requested when the information is requested to send. However, a part of reasons may not be eliminated. For such a case, it is determined that the slice information is not continuously requested. For example, the failure prompt information indicates that the target application does not subscribe an available network slice. In this case, it may be determined that the slice information is not continuously requested.

In an embodiment, the method may further the following operations.

Failure prompt information is received.

Information is re-requested to the server according to the application information and the terminal information when the failure prompt information indicates a repeat request of the slice information and the number of request times does not reach a predetermined number of times.

As the request information is sent to the server through the network, there may be phenomena that the request information may be tampered by an illegal node and the like during transmission, to cause the failure of the request for the slice information. In this case, it is determined that the slice information is re-requested.

However, in order to reduce the unnecessary repetition, only when the number of request repetition times does not reach the predetermined number of times, the request is repeated continuously. Once the number of request repetition times reaches the predetermined number of times, the request is stopped. The predetermined number of times herein may be a pre-configured value, such as 2, 3 or 5.

Figure 5:
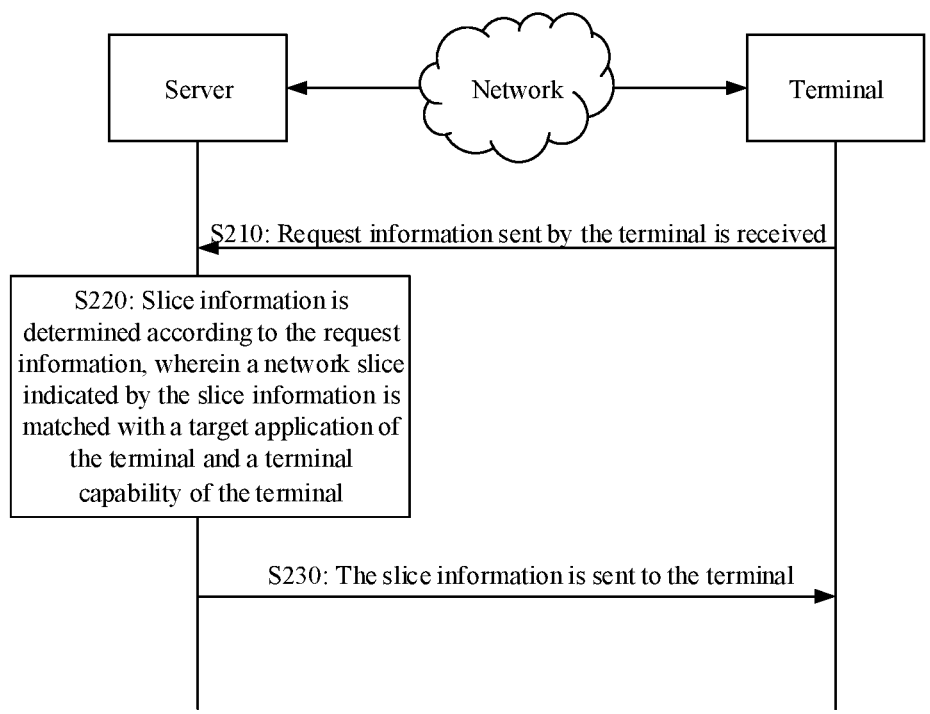
FIG. 5 is a flow chart illustrating an information processing method, according to an example embodiment.

As shown in FIG. 5, the present disclosure provides an information processing method, which includes the following operations.

In S210, request information sent by a terminal is received.

In S220, slice information is determined according to the request information, wherein a network slice indicated by the slice information is matched with a target application of the terminal and a terminal capability of the terminal.

In S230, the slice information is sent to the terminal.

The information processing method is applied to a server.

The type of the server may refer to the corresponding descriptions on the above embodiment and will not be elaborated herein.

In the embodiment of the disclosure, the server receives the sent request information; and based on the request information, the server searches the slice information of the network slice matched with the target application and the terminal capability, and sends the slice information to the terminal.

In the embodiment of the disclosure, when the network slice for transmitting the target application is determined for the terminal, not only the application information of the target application, but also the terminal capability of the terminal running the target application is considered, and thus the network slice more suitable for the present terminal to run the target application for data transmission is selected.

In an embodiment, the method may further include that: network slices subscribed by the target application are acquired.

The operation in S220 may include that: according to the request information, slice information of a network slice matched with the terminal capability is determined from the network slices subscribed by the target application.

Herein, the network slices subscribed by the target application may be network slices agreed by the application service provider of the target application and the communication operator of the communication network and available for the target application.

There may be one or more network slices subscribed by the target application. There are a plurality of network slices, and the plurality of network slices have different transmission properties and may meet different terminal capabilities in use.

For example, three different network slices are subscribed by one network game application. The network slice 1 among the three network slices is available for wearable devices such as the smartwatch or smart bracelet, the network slice 2 among the three network slices is available for handheld terminals such as the mobile phone or tablet, and the network slice 3 among the three network slices is available for large terminals such as the notebook or desktop computer or smart television.

If it is determined according to the terminal information that the terminal sending the request information is a smartwatch, the server sends the slice information of the network slice 1 to the terminal. If it is determined according to the terminal information that the terminal sending the request information is a mobile phone, the server sends the slice information of the network slice 2 to the terminal.

In an embodiment, the operation that the network slices subscribed by the target application are acquired may include that: the network slices subscribed by the target application are acquired from an application service platform of the target application; and/or, the network slices subscribed by the target application are acquired from a subscription database of a communication network.

If the server is neither a server in the application service platform of the target application nor a server which stores subscription data of the subscription database in the communication network, the server needs to request the network slices subscribed by the target application from other devices. For example, the server is a server from the device supplier of the terminal, and the server may request the network slices subscribed by the target application from the application service platform of the target application and/or the subscription database.

In an embodiment, if the application service platform of the target application or subscription database knows the address of the server in advance, the application service platform of the target application and subscription database may push subscription information of the network slice subscribed by the target application to the server.

Certainly, if the server executing the information processing method is a server in the application service platform or a server of the subscription database, the operation in S220 may include that: slice information of the network slices subscribed by the target application is read from a preset position.

In an embodiment, the request information carries a request label and the request ID.

Figure 6:
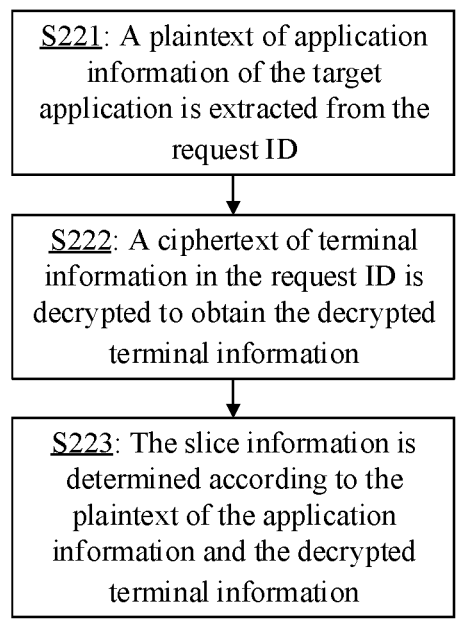
FIG. 6 is a flow chart illustrating an information processing method, according to an example embodiment.

As shown in FIG. 6, the operation in S220 may include the following actions.

In S221, a plaintext of application information of the target application is extracted from the request ID.

In S222, a ciphertext of terminal information in the request ID is decrypted to obtain the decrypted terminal information.

In S223, the slice information is determined according to the plaintext of the application information and the decrypted terminal information.

In the embodiment of the disclosure, the operations in S221 to S223 may be executed sequentially, and the operations in S221 and S222 may also be executed in parallel.

To sum up, the request ID carried by the request information in the embodiment of the disclosure includes the application information in the plaintext and the terminal information in the ciphertext, thereby achieving the characteristic of protecting the terminal information used by an individual.

In an embodiment, the request information further includes user identity information of the terminal. The user identity information may be information uniquely identifying the user identity such as a mobile phone number corresponding to the SIM card, an e-mail address, and an account of instant messaging. The user identity information may be used by the server to determine whether the terminal has an authority to use the network slice.

In such case, the method may further include that: user identity authentication is performed according to the user identity information.

The operation in S230 may include that: the slice information is returned to the terminal after the user identity authentication is successful.

In an embodiment, the method may further include the following operation.

Prompt information for an opening failure of use of the network slice is returned to the terminal after the user identity authentication is failed.

The operation that the user identity authentication is performed according to the user identity information may include the following actions.

An authentication request is sent to the application service platform of the target application or the subscription database, the authentication request including the user identity information.

An authentication result returned based on the authentication request is received. The authentication result includes a result of an authentication success and/or an authentication failure.

In some embodiments, if the present server stores an authorization record required by the authentication, the server may perform local authentication.

For example, in a case where only the authorized user uses the network slice, the authorization record on the authorized user is recorded in the subscription database and/or the application service platform.

In an embodiment, the method may further include the following operation.

A request record of the slice information is generated according to a sending condition of the slice information.

In an embodiment, the request record includes the application information, the terminal information and the sent slice information. If the terminal repeatedly requests the slice information, the repeat request of the terminal may be rejected according to the request record. With the generation of the request record, the subsequent management on the network slice of the target application may be convenient. For example, when the target application is provided with a network slice using function, an application service provided through use of the target application by a terminal is determined according to the request record, but the service quality of the application service is not improved with the network slice. The method may further include that: according to the request record, a request prompt is sent to a terminal not requesting the slice information.

In an embodiment, the method may further include the following operation.

Failure prompt information is sent when the request information is rejected.

In an embodiment, the operation that the failure prompt information is sent when the request information is rejected may include the following action.

When the target application subscribes network slices and the subscribed network slices do not include a network slice matched with the terminal capability, the failure prompt information is sent.

In an embodiment, the failure prompt information may be configured to prompt that there is no network slice matched with the terminal capability. Such a case is also unsuitable for repeatedly requesting the slice information.

Exemplarily, the operation that the failure prompt information is sent when the request information is rejected may include the following action.

When it is determined according to the request information that the terminal requests the slice information for the target application, failure prompt information indicating a repeat request is sent.

By sending the failure prompt information indicating the repeat request, the number of repeat requests of the terminal may be reduced, and high complexity of the server due to the repeat request may be reduced.

In an embodiment, the slice information may be carried in a DNN configuration and send to the terminal. Certainly, there are many manners to send the slice information, which is not limited to the manner of carrying the slice information in the DNN configuration to send to the terminal. For example, the server may further independently send a data packet carrying configuration information. The information format of the data packet is irrelevant to the DNN configuration.

The present disclosure provide an information processing method. Related descriptions on the information processing method are as follows.

Security scenario: when a special application first uses the network slice function on the electronic device, it needs to open the network slice function through an SIM card and then sends a present APP ID to the network slice service provider. The network slice service provider records the present APP ID and pushes a special DNN configuration. When the special application uses the 5G slice function and the APP ID is mapped to the special DNN, a re-registration process of the special application is triggered if there is no matched DNN, so as to prevent the APP ID from being tampered or stolen. The DNN herein may include the above network slice.

The APP ID herein may be one of the above request IDs. The special application herein may be the above target application.

In an embodiment, the same application may apply for different slice types according to the device and the SIM card.

The Application IDs of the special application are the same. When the application is installed on different devices (for example, a mobile phone and a watch), the actual demands on the slice are not the same completely. The APP ID may distinguish the device type to use the high-bandwidth network slice (the mobile phone device) or the low-power network slice. For example, the terminal using the high-bandwidth network slice may include a mobile phone and the like. The terminal using the low-power network slice may include a watch.

In the embodiment of the disclosure, by providing the secure APP ID generation manner in the 5G SA network, the APP ID is combined with the hardware device and the SIM ID to prevent from being tampered and stolen, thereby protecting the interests of the user. Different network slice policies may be used according to requirements of different devices/SIMs, so the user experience is improved, and the use of the APP ID slice manner is promoted. The Application ID herein is an application identifier.

From the perspective of the security of the APP ID in use, by combining the Application ID+hardware ID+SIM into the APP ID, the security of the APP ID slice is ensured, without being stolen.

Specifically, the above APP ID is obtained by splicing the application in the plaintext, the terminal information in the ciphertext and the SIM card information in the ciphertext.

The terminal information includes, but is not limited to: CPU ID, IMEI and/or WIFI MAC address.

The SIM card information includes SIM-ICCID.

Figure 7:
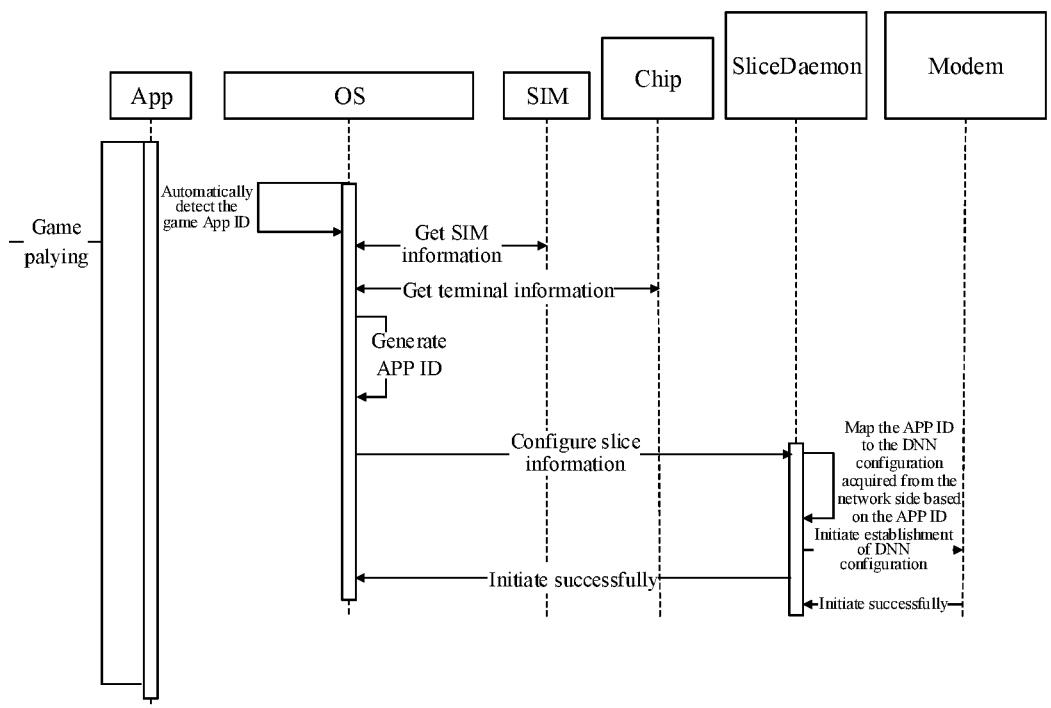
FIG. 7 is a flow chart illustrating an information processing method, according to an example embodiment.

Referring to FIG. 7, with the game application as an example, the application of the network slice for data transmission may include the following operations.

The OS automatically detects the above Application ID. In FIG. 7, the game application (App) is providing a game playing service for the user.

The OS gets SIM card information of an SIM, such as the ICCID of the SIM.

The OS gets device information from a chip, for example, acquires type information of a terminal, and IDs of various hardware chips of the terminal such as the CPU ID, ID of a network card or ID of a Modem.

The OS constructs the above APP ID.

The OS requests slice information of a network slice from a server based on the constructed APP ID, and receives a DNN configuration carrying the slice information.

The OS sends a slice request to a SliceDeamon.

According to the DNN configuration, the SliceDeamon maps the APP ID to the DNN configuration carrying the slice information.

The SliceDeamon requests the Modem to establish the DNN, i.e., initiates establishment of the DNN configuration.

The SliceDeamon receives an establishment result returned from the Modem. As shown in FIG. 7, if the DNN is established successfully, a notification of successful initiation is returned. In case of the successful establishment, the SliceDeamon in the terminal returns relevant information on use of the slice instance for data transmission to the OS. For example, the information includes, but is not limited to: an IP address, a DNS and/or a network card interface name (Iface), etc.

Figure 8:
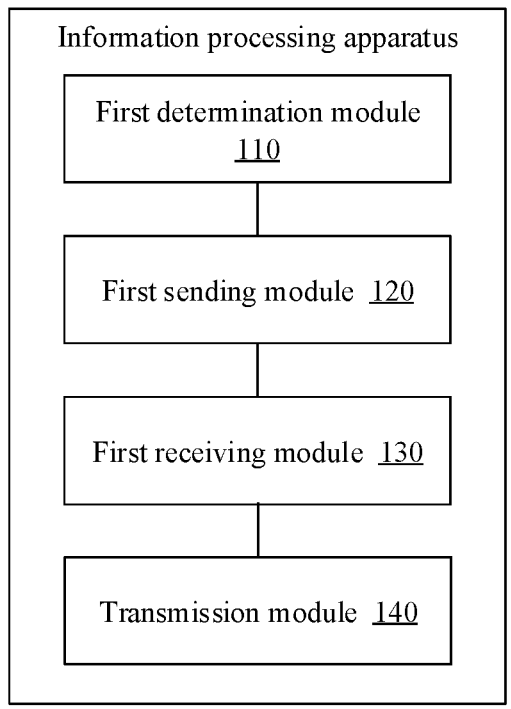
FIG. 8 is a structural schematic diagram illustrating an information processing apparatus, according to an example embodiment.

As shown in FIG. 8, the present disclosure provides an information processing apparatus. The information processing apparatus is applied to a terminal and includes a first determination module 110, a first sending module 120, a first receiving module 130 and a transmission module 140.

The first determination module 110 is configured to determine application information of a target application and terminal information of the terminal. The target application is an application requiring use of a network slice for data transmission and the terminal information is able to reflect a terminal capability of the terminal.

The first sending module 120 is configured to send request information to a server according to the application information and the terminal information.

The first receiving module 130 is configured to receive slice information returned by the server based on the request information. A network slice indicated by the slice information is matched with the target application and the terminal capability.

The transmission module 140 is configured to transmit data of the target application based on the network slice indicated by the slice information.

In some embodiments, the first determination module 110, the first sending module 120, the first receiving module 130 and the transmission module 140 may be pure software modules. The pure software modules can implement, after being executed by a processor, acquisition of the slice information of the network slice and data transmission of the target application.

In some embodiments, the first determination module 110, the first sending module 120, the first receiving module 130 and the transmission module 140 may be software-hardware combined modules. The software-hardware combined modules include, but are not limited to, programmable arrays. The programmable arrays include, but are not limited to, field programmable arrays or complex programmable arrays.

In further some embodiments, the first determination module 110, the first sending module 120, the first receiving module 130 and the transmission module 140 may be pure hardware modules. The pure hardware modules include, but are not limited to, Application Specific Integrated Circuits (ASICs).

It is to be understood that the terminal information includes at least one of the following: type information on a terminal type of the terminal, component information of hardware of the terminal, or type information on a network type supported by the terminal.

It is to be understood that the component information of the hardware component includes at least one of the following:

processor information of a processor in the terminal; or, network card information of a network card in the terminal;

and/or, the type information on the network type supported by the terminal includes at least one of the following:

SIM card information of an SIM in the terminal; and identity information of a communication operator to which the SIM in the terminal belongs.

It is to be understood that the first sending module 120 is specifically configured to encrypt the terminal information to obtain a ciphertext of the terminal information, generate a request ID, the request ID including a plaintext of the application information and the ciphertext of the terminal information, and send request information carrying the request ID to the server.

It is to be understood that the transmission module 140 is specifically configured to send a creation request to a core network according to the slice information and a URSP, the creation request being configured to request the core network to create a slice instance of the network slice indicated by the slice information, receive instance information of the slice instance created based on the creation request, and route the data of the target application according to the instance information.

It is to be understood that the first receiving module 130 is specifically configured to receive a DNN configuration returned by the server based on the request information. The DNN configuration carries the slice information.

Figure 9:
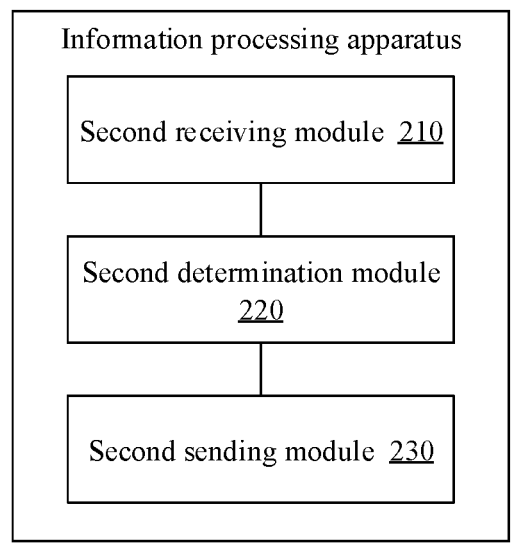
FIG. 9 is a structural schematic diagram illustrating an information processing apparatus, according to an example embodiment.

As shown in FIG. 9, the present disclosure provides an information processing apparatus. The information processing apparatus includes a second receiving module 210, a second determination module 220 and a second sending module 230.

The second receiving module 210 is configured to receive request information sent by a terminal.

The second determination module 220 is configured to determine slice information according to the request information, wherein a network slice indicated by the slice information is matched with a target application of the terminal and a terminal capability of the terminal.

The second sending module 230 is configured to send the slice information to the terminal.

In some embodiments, the second receiving module 210, the second determination module 220 and the second sending module 230 may be pure software modules. The pure software modules can implement, after being executed by a processor, determination of the slice information of the network slice.

In some embodiments, the second receiving module 210, the second determination module 220 and the second sending module 230 may be software-hardware combined modules. The software-hardware combined modules include, but are not limited to, programmable arrays. The programmable arrays include, but are not limited to, field programmable arrays or complex programmable arrays.

In further some embodiments, the second receiving module 210, the second determination module 220 and the second sending module 230 may be pure hardware modules. The pure hardware modules include, but are not limited to, ASICs.

It is to be understood that the apparatus may further include an acquisition module.

The acquisition module is configured to acquire network slices subscribed by the target application.

The second determination module 220 is configured to determine, according to the request information, slice information of a network slice matched with the terminal capability from the network slices subscribed by the target application.

It is to be understood that the acquisition module is specifically configured to acquire the network slices subscribed by the target application from an application service platform of the target application, and/or, acquire the network slices subscribed by the target application from a subscription database of a communication network.

It is to be understood that the request information carries a request label, and the request ID.

The second determination module 220 is specifically configured to extract a plaintext of application information of the target application from the request ID, decrypt a ciphertext of terminal information in the request ID to obtain the decrypted terminal information, and determine the slice information according to the plaintext of the application information and the decrypted terminal information.

The technical improvements provided by the embodiment of the disclosure may have the following characteristics.

The disclosure expands use of delay detection, such that the delay detection is still available on the server that forbids an Internet Control Messages Protocol (ICMP) data packet based on an ICMP protocol, increases accuracy of the detection delay, dynamically adjusts the address of the detection server, and acquires the address of the server from multiple network communication protocols (Transmission Control Protocol (TCP) or User Datagram Protocol (UDP) or the like) without the limitations of the protocols.

The present disclosure provides a communication device, which includes a memory and a processor connected to the memory.

The memory is configured to store an instruction executable for the processor.

The processor is configured to execute the information processing method provided by the above any technical improvement.

The processor may include various types of storage media. The storage media are non-transitory computer storage media that can continuously perform memory storage of the information thereon after the communication device is powered off.

The communication device herein may be the above terminal or server. The processor may be connected to the memory through a bus or the like, and configured to read an executable program stored on the memory. For example, the processor can execute at least one of any method shown in FIG. 1, FIG. 3, FIG. 4, FIG. 5, FIG. 6 and FIG. 7.

Figure 10:
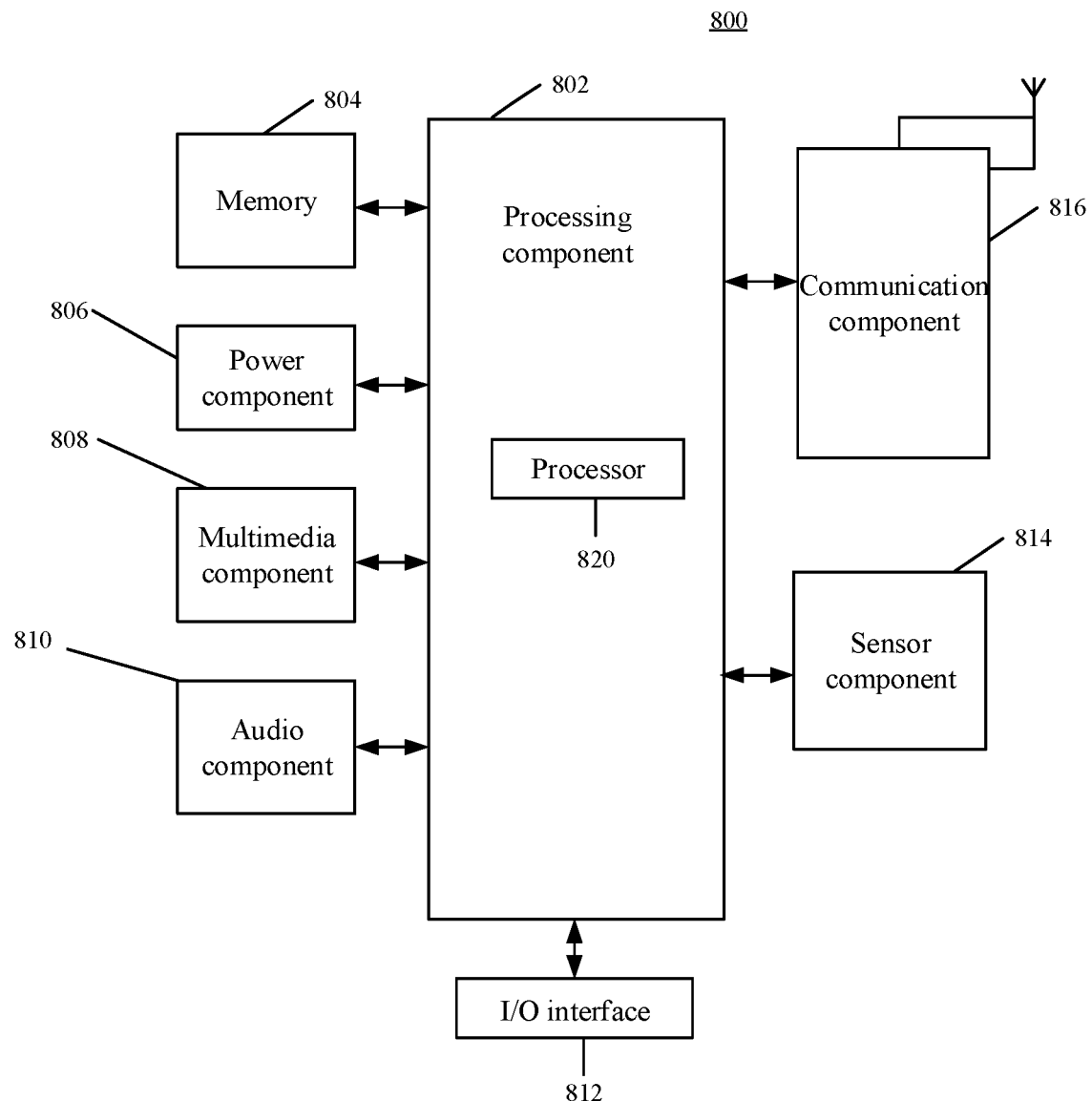
FIG. 10 is a structural schematic diagram illustrating a communication device, according to an example embodiment.

FIG. 10 is a block diagram illustrating a mobile communication device 800 according to an embodiment. For example, the communication device 800 may be a mobile phone, a mobile computer, etc.

Referring to FIG. 10, the communication device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the communication device 800, such as the operations associated with display, telephone calls, data communications, camera operations, and recording operations. The processing component 802 may include one or more processors 820 to execute instructions to perform all or part of the operations in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any application or method operated on the communication device 800, contact data, phonebook data, messages, pictures, videos, etc. The memory 804 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power to various components of the communication device 800. The power component 806 may include a power management system, one or more power sources, and any other components associated with the generation, management, and distribution of power in the communication device 800.

The multimedia component 808 includes a screen providing an output interface between the communication device 800 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a Microphone (MIC) configured to receive an external audio signal when the communication device 800 is in an operation mode, such as a call mode, a recording mode, and a voice recognition mode. The received audio signal may further be stored in the memory 804 or transmitted via the communication component 816. In some embodiments, the audio component 810 further includes a speaker configured to output audio signals.

The I/O interface 812 provides an interface between the processing component 802 and peripheral interface modules. The peripheral interface modules may be a keyboard, a click wheel, buttons, and the like. The buttons may include, but are not limited to, a home button, a volume button, a starting button, and a locking button.

The sensor component 814 includes one or more sensors to provide status assessments of various aspects of the communication device 800. For instance, the sensor component 814 may detect an open/closed status of the device 800, relative positioning of components, such as the display and the keypad of the device 800, and the sensor component 814 may also detect a change in position of the communication device 800 or a component of the communication device 800, a presence or absence of user contact with the communication device 800, an orientation or an acceleration/deceleration of the communication device 800, and a change in temperature of the communication device 800. The sensor component 814 may include a proximity sensor, configured to detect the presence of nearby objects without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the communication device 800 and another device. The communication device 800 may access a communication standard-based wireless network, such as a Wireless Fidelity (Wi-Fi) network, a 2nd-Generation (2G) or 3rd-Generation (3G) network or a combination thereof. In one or more embodiments, the communication component 816 receives a broadcast signal or broadcast associated information from an external broadcast management system via a broadcast channel. In one or more embodiments, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

Exemplarily, the communication device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an one or more embodiments, a non-transitory computer-readable storage medium including an instruction is further provided, for example, the memory 804 including an instruction. The instruction may be executed by the processor 820 of the communication device 800 to complete the above method. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

The present disclosure provides a non-transitory computer-readable storage medium. An instruction in the storage medium is executed by a processor of UE to cause the UE to perform the information processing method provided by the above any embodiment, and execute at least one of any method shown in FIG. 1, FIG. 3, FIG. 4, FIG. 5, FIG. 6 and FIG. 7.

The information processing method may include the following operations.

Application information of a target application and terminal information of a terminal are determined, wherein the target application is an application requiring use of a network slice for data transmission and the terminal information can reflect a terminal capability of the terminal. Request information is sent to a server according to the application information and the terminal information. Slice information returned by the server based on the request information is received, wherein a network slice indicated by the slice information is matched with the target application and the terminal capability.

Data of the target application is transmitted based on the network slice indicated by the slice information.

It is to be understood that the terminal information includes at least one of the following: type information on a terminal type of the terminal, component information of hardware of the terminal, or type information on a network type supported by the terminal.

It is to be understood that the component information of the hardware component includes at least one of the following:

processor information of a processor in the terminal; or,
network card information of a network card in the terminal;

and/or,
the type information on the network type supported by the terminal includes at least one of the following:

SIM card information of an SIM in the terminal; or,
identity information of a communication operator to which the SIM in the terminal belongs.

It is to be understood that the operation that the request information is sent to the server according to the application information and the terminal information may include the following actions. The terminal information is encrypted to obtain a ciphertext of the terminal information. A request ID is generated, the request ID including a plaintext of the application information and the ciphertext of the terminal information. Request information carrying the request ID is sent to the server.

It is to be understood that the operation that the data of the target application is transmitted based on the network slice indicated by the slice information may include the following actions. A creation request is sent to a core network according to the slice information and a URSP, the creation request being configured to request the core network to create a slice instance of the network slice indicated by the slice information. Instance information of the slice instance created based on the creation request is received. The data of the target application is routed according to the instance information.

It is to be understood that the method may further include the following operations. Failure prompt information is received, and information is re-requested to the server according to the application information and the terminal information when the failure prompt information indicates a repeat request of the slice information and the number of request times does not reach a predetermined number of times.

Another information processing method is provided. The method may further include the following operations. Request information sent by a terminal is received. Slice information is determined according to the request information, wherein a network slice indicated by the slice information is matched with a target application of the terminal and a terminal capability of the terminal.

The slice information is sent to the terminal.

It is to be understood that the method may further include that: network slices subscribed by the target application are acquired.

The operation that the slice information is determined according to the request information may include the following action. According to the request information, slice information of a network slice matched with the terminal capability is determined from the network slices subscribed by the target application.

It is to be understood that the operation that the network slices subscribed by the target application are acquired may include that: the network slices subscribed by the target application are acquired from an application service platform of the target application; and/or, the network slices subscribed by the target application are acquired from a subscription database of a communication network.

It is to be understood that the request information carries a request label, and the request ID.

The operation that the slice information is determined according to the request information may include the following actions. A plaintext of application information of the target application is extracted from the request ID. A ciphertext of terminal information in the request ID is decrypted to obtain the decrypted terminal information. The slice information is determined according to the plaintext of the application information and the decrypted terminal information.

It is to be understood that the method may further include the following operation. When it is determined according to the request information that the terminal requests the slice information for the target application, failure prompt information indicating a repeat request is sent.

The technical improvements provided by the present disclosure may have the following beneficial effects.

As can be seen from the above embodiments, according to the technical improvements provided by the disclosure, when a network slice used by the target application is selected, the determination of the network slice is made not only according to the target application but also in combination with the terminal capability of the terminal running the target application. In this way, the selected network slice is adapted to the terminal capability of the terminal, such that the situation that the communication service quality such as the transmission rate cannot reach an expected effect due to a fact that the terminal capability does not support the capability required for use of the network slice is reduced; and on the other hand, the situation that the terminal loses its advantages of power saving and the like due to the use of the network slice is also reduced. Therefore, the improvements of the disclosure achieves the adaption between the terminal capability and the selected network slice, and has an improved communication quality of the network slice and keeps the advantages of the terminal for its own characteristics.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as examples only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for information processing, applied to a terminal, and comprising:
    determining application information of a target application and terminal information of the terminal, wherein the target application is an application requiring use of a network slice for data transmission, and the terminal information is able to reflect a terminal capability of the terminal;
    sending request information to a server according to the application information and the terminal information;
    receiving slice information returned by the server based on the request information, wherein a network slice indicated by the slice information is matched with the target application and the terminal capability; and
    transmitting data of the target application based on the network slice indicated by the slice information,
    wherein sending the request information to the server according to the application information and the terminal information comprises:
        encrypting the terminal information to obtain a ciphertext of the terminal information;
        generating a request identifier (ID), the request ID comprising a plaintext of the application information and the ciphertext of the terminal information; and
        sending the request information carrying the request ID to the server.

2. The method of claim 1, wherein the terminal information comprises at least one of:
    terminal type information on a terminal type of the terminal;
    hardware component information of hardware of the terminal; or
    network type information on a network type supported by the terminal.

3. The method of claim 2, wherein the hardware component information of the hardware component comprises at least one of:
    processor information of a processor in the terminal; or
    network card information of a network card in the terminal;
    wherein the network type information on the network type supported by the terminal comprises at least one of:
    Subscriber Identity Module (SIM) card information of an SIM in the terminal; or
    identity information of a communication operator to which the SIM in the terminal belongs.

4. The method of claim 1, wherein transmitting the data of the target application based on the network slice indicated by the slice information comprises:
    sending a creation request to a core network according to the slice information and a user equipment (UE) route selection policy (URSP), the creation request being configured to request the core network to create a slice instance of the network slice indicated by the slice information;
    receiving instance information of the slice instance created based on the creation request; and
    routing the data of the target application according to the instance information.

5. The method of claim 1, further comprising:
    receiving failure prompt information; and
    re-requesting information to the server according to the application information and the terminal information when the failure prompt information indicates a repeat request of the slice information and a number of request times does not reach a predetermined number of times.

6. A method for information processing, comprising:
receiving request information sent by a terminal;
determining slice information according to the request information, wherein a network slice indicated by the slice information is matched with a target application of the terminal and a terminal capability of the terminal; and
sending the slice information to the terminal,
wherein the request information comprises a request label and a request identifier (ID); and determining the slice information according to the request information comprises:
   extracting a plaintext of application information of the target application from the request ID;
   decrypting a ciphertext of terminal information in the request ID to obtain the decrypted terminal information; and
   determining the slice information according to the plaintext of the application information and the decrypted terminal information.

7. The method of claim 6, further comprising:
acquiring network slices subscribed by the target application; and
determining the slice information according to the request information comprising:
determining, according to the request information, slice information of a network slice matched with the terminal capability from the network slices subscribed by the target application.

8. The method of claim 7, wherein acquiring the network slices subscribed by the target application comprises at least one of following acts:
   acquiring the network slices subscribed by the target application from an application service platform of the target application; or,
   acquiring the network slices subscribed by the target application from a subscription database of a communication network.

9. The method of claim 6, further comprising:
sending, responsive to determining according to the request information that the terminal requests the slice information for the target application, failure prompt information for indicating a repeat request.

10. An apparatus, comprising:
one or more processors;
a non-transitory computer-readable storage medium for storing instructions executable by the one or more processors; and
a plurality of programs that, when executed by the one or more processors, cause the apparatus to perform predefined functions, the plurality of programs further comprising:
   a first determination module, configured to determine application information of a target application and terminal information of a terminal, wherein the target application is an application requiring use of a network slice for data transmission, and the terminal information is able to reflect a terminal capability of the terminal;
   a first sending module, configured to send request information to a server according to the application information and the terminal information;
   a first receiving module, configured to receive slice information returned by the server based on the request information, wherein a network slice indicated by the slice information is matched with the target application and the terminal capability; and
   a transmission module, configured to transmit data of the target application based on the network slice indicated by the slice information,
   wherein the first sending module is further configured to:
   encrypt the terminal information to obtain a ciphertext of the terminal information, generate a request identifier (ID), the request ID comprising a plaintext of the application information and the ciphertext of the terminal information, and send request information carrying the request ID to the server.

11. The apparatus of claim 10, wherein the terminal information comprises at least one of:
   terminal type information on a terminal type of the terminal,
   hardware component information of hardware of the terminal, or
   network type information on a network type supported by the terminal.

12. The apparatus of claim 11, wherein
the hardware component information of the hardware component comprises at least one of:
   processor information of a processor in the terminal; or
   network card information of a network card in the terminal; and/or,
the network type information on the network type supported by the terminal comprises at least one of:
   Subscriber Identity Module (SIM) card information of an SIM in the terminal; or
   identity information of a communication operator to which the SIM in the terminal belongs.

13. The apparatus of claim 10, wherein the transmission module is configured to send a creation request to a core network according to the slice information and a user equipment (UE) route selection policy (URSP), the creation request being configured to request the core network to create a slice instance of the network slice indicated by the slice information, receive instance information of the slice instance created based on the creation request, and route the data of the target application according to the instance information.

14. The apparatus of claim 10, wherein the first receiving module is further configured to receive failure prompt information; and
the first sending module is further configured to re-request information to the server according to the application information and the terminal information when the failure prompt information indicates a repeat request of the slice information and a number of request times does not reach a predetermined number of times.

15. An information processing apparatus implementing the method of claim 6, the information processing apparatus comprising:
one or more processors;
a non-transitory computer-readable storage medium for storing instructions executable by the one or more processors; and
a plurality of programs that, when executed by the one or more processors, cause the information processing apparatus to perform predefined functions, the plurality of programs further comprising:
   a second receiving module, configured to receive request information sent by a terminal;
   a second determination module, configured to determine slice information according to the request information, wherein a network slice indicated by the slice information is matched with a target application of the terminal and a terminal capability of the terminal; and a second sending module, configured to send the slice information to the terminal, wherein the request information comprises a request label and a request identifier (ID); and the second determination module is further configured to:

extract a plaintext of application information of the target application from the request ID, decrypt a ciphertext of terminal information in the request ID to obtain the decrypted terminal information, and determine the slice information according to the plaintext of the application information and the decrypted terminal information.

16. The apparatus of claim 15, further comprising:

an acquisition module, configured to acquire network slices subscribed by the target application;

wherein the second determination module is configured to determine, according to the request information, slice information of a network slice matched with the terminal capability from the network slices subscribed by the target application.

* * * * *